Oct. 10, 1961 H. TAUDT 3,004,100
METHOD AND APPARATUS FOR INSERTING EXTRANEOUS MATTER IN SCREENED HALF-TONE PRINTING PLATES UPON PRODUCTION THEREOF
Filed Aug. 27, 1958 2 Sheets-Sheet 1

Oct. 10, 1961 H. TAUDT 3,004,100

METHOD AND APPARATUS FOR INSERTING EXTRANEOUS MATTER IN SCREENED HALF-TONE PRINTING PLATES UPON PRODUCTION THEREOF

Filed Aug. 27, 1958 2 Sheets-Sheet 2

United States Patent Office 3,004,100

Patented Oct. 10, 1961

3,004,100

METHOD AND APPARATUS FOR INSERTING EXTRANEOUS MATTER IN SCREENED HALF-TONE PRINTING PLATES UPON PRODUCTION THEREOF

Heinz Taudt, Kiel, Germany, assignor to Dr.-Ing. Rudolf Hell Kommanditgesellschaft, Kiel-Dietrichsdorf, Germany, a company of Germany Filed Aug. 27, 1958, Ser. No. 757,627
Claims priority, application Germany Sept. 7, 1957
8 Claims. (Cl. 178—6.6)

This invention is concerned with a method and apparatus for inserting in screened half-tone printing blocks or plates, upon production thereof in electronically controlled machines, extraneous material such as descriptive matter, line drawings and the like.

In the reproduction technique, labels or descriptive matter, line drawings and the like or matter generally extraneous of or foreign to a copy to be reproduced is inserted in the copy or copied thereinto by mounting operations. These operations involve cutting out the parts to be added and pasting them at the desired places on the copy to be reproduced. If necessary, the composite copy is photographed and a positive is produced which is employed as the copy from which the printing plate is made. This mounting technique, when it involves the adding of writing or line drawings and the like, is inapplicable in making printing plates by the use of electronically controlled machines.

In the production of printing plates, with the use of electronically controlled machines, a distinction is made between two kinds of printing plates, namely, half-tone printing plates and line plates. The first type of plates, serving for the reproduction of half-tone copies, pictures the like, have in addition to a line screen also a point screen, whereby the number of screen points per unit of length in an engraving line is equal to the number of engraving lines per unit of length. For producing the point screen, there is required a frequency which is supplied by a frequency generator. Half-tone printing plates are engraved with a number of lines usually amounting to less than 100 lines. A peculiarity of half-tone printing plates is recognized in the fact that substantially black copy or picture parts contain small white dots and substantially white picture parts contain small black dots. In the intermediate tones, the black (retained) screen elements and the white (cut out) screen elements appear upon surfaces of the same order of magnitude.

However, in line printing plates, serving for the reproduction of untoned line drawings, notes, writing, and the like, there are only two tone values, namely, substantially black and substantially white. Accordingly, the black copy portions which serve for the printing are simply left intact and the white non-printing copy portions are completely cut out. A point screen is in view of the absence of half-tones unnecessary. The non-printing white areas are moreover undercut, that is, they are cut considerably deeper than white areas in half-tone printing plates, so as to avoid inking at such areas the paper used for the printing which in the printing operation may easily sag at the white areas due to the absence of supporting black points. The line printing plates are in addition engraved with a greater number of lines than half-tone printing plates, the number of lines being usually not under 100 lines per centimeter. This is necessary so that fine lines of a copy are not distorted or steplike represented in subsequent reproduction, a danger which exists upon oblique cutting of such lines with a line number per centimeter that is too low.

If it is in the electronic production of printing plates a matter of inserting untoned picture portions in toned pictures, the half-tone engraving within one and the same printing plate, of the toned picture parts must be automatically carried over or changed into line engraving of the untoned picture parts which are to be added, and vice versa. The scanning of a copy provided with mounted parts would upon scanning the mounted portions not convey criteria to the photocell whether or not these mounted parts are toned or untoned. Since the photocell, operating in the nature of a photometer reacts only to brightness differences, there arises the problem to create for the photocell a brightness criterion so that it can distinguish between toned and untoned picture or copy parts and affect a control device for carrying over or changing the half-tone engraving to a line engraving, and vice versa.

In accordance with the invention, the brightness criterion is produced in the photoelectric scanning by the provision of a thin, transparent or translucent foil placed upon the half-tone copy to be reproduced, such foil being either slightly frosted or tinged slightly gray or both and carrying in deep black and/or bright white the matter to be added, writing or line drawing and the like, such that the black on the foil is blacker than the deepest black on the copy which is lightened by the frosted foil, and that the white on the foil is whiter than the brightest white on the copy which is darkened by the foil. Control means will be energized upon appearance, during the scanning operation, of the upper threshold limit of the white of the foil, such control means effecting change of the half-tone engraving to line engraving and effecting upon lowering of the corresponding threshold value change of the line engraving to resume half-tone engraving again.

The insertion into or copying upon toned copies untoned picture parts may take the following forms, namely (1) deep black writing or drawing appears in the intermediate tones or in the dark tones of the picture copy; (2) bright white writing or drawing appears in the intermediate tones or in the dark tones of the picture copy; (3) deep black writing or drawing upon an untoned bright white background appears in the intermediate tones or the dark tones of the picture copy; and (4) bright white writing or drawing upon an untoned deep black background appears in the intermediate tones or in the bright tones of the picture copy.

The effect of the frosting of the foil is that the dark or black parts of the picture copy will be somewhat lightened or brightened due to diffused scattering of the light. The writing, lettering or drawing which is to be added to the contents of the copy to be reproduced is placed upon the foil, for example, by deep black ink, the blackness of which exceeds the blackness of the blackest picture tones, thus producing a contrast in the form of a slight blackening leap, between the writing, lettering or drawing and the black parts of the picture copy, which is utilized for causing energization of the control means.

The frosting of the foil does not effect either darkening or brightening of the white parts of the picture copy. If it is desired to add to the picture copy white writing, lettering or white drawing, the corresponding white matter is put on the foil in bright white color (lithopone), the brightness of which is not exceeded by the brightest parts of the picture copy. In order to produce a contrast between the white of the foil and the brightest white on the picture copy, the foil is tinged slightly gray, thus somewhat darkening the white parts of the picture copy.

If the foil is frosted and also tinged gray, the darkest parts of the picture copy will be somewhat darkened, if such is possible. It therefore appears that the lightening or brightening of the dark parts of the picture copy, effected by the frosting of the foil, is cancelled by the darkening of such parts caused by the gray tinge. However it is by suitable dosing of the frosting and the gray coloring possible to provide for an effect according to which the brightening caused by the frosting predominates over the darkening caused by the gray tinge, thereby obtaining with respect to the black as well as with respect to the white parts of the picture copy a measurable contrast between the black of the foil and the deepest black of the picture copy and also between the white of the foil and the brightest white of the copy, which may be utilized for effecting the actuation of the control means.

The simultaneously effected lightening or brightening of the dark parts and darkening of the white parts of the picture copy results in a uniform contrast compression of the entire tone value range of the picture copy. Such compression may, however, be compensated by suitable setting of the gradation regulator to cause stronger resolution of the black and white tones.

The method according to the invention is in accordance with another feature and object thereof practiced by apparatus comprising a low value limiter (amplitude filter) for suppressing the picture copy signal which is branched from the picture channel, and amplified and rectified, to a voltage corresponding to the brightest white, means for connecting the output of the limiter with the regulation input of the regulation amplifier for the drive of the engraving system, such amplifier being disposed in the picture channel, the limited picture signal voltage regulating the regulation amplifier so that the current delivered by the amplifier for the control of the engraving system leaps upon appearance of the threshold value of the white of the foil to its highest value which corresponds to increased depth of penetration of the engraving tool, for undercutting, into the material of the blank which is to form the printing plate, and an electromagnetic or electronic control relay controlled by the limiter or by the regulation amplifier which discontinues the supply of screen frequency from the superimposing stage contained in the picture channel.

The foregoing and further objects and features will appear from the description of an embodiment of the invention which is rendered below with reference to the accompanying drawing, wherein.

Figures 3A, 3B:
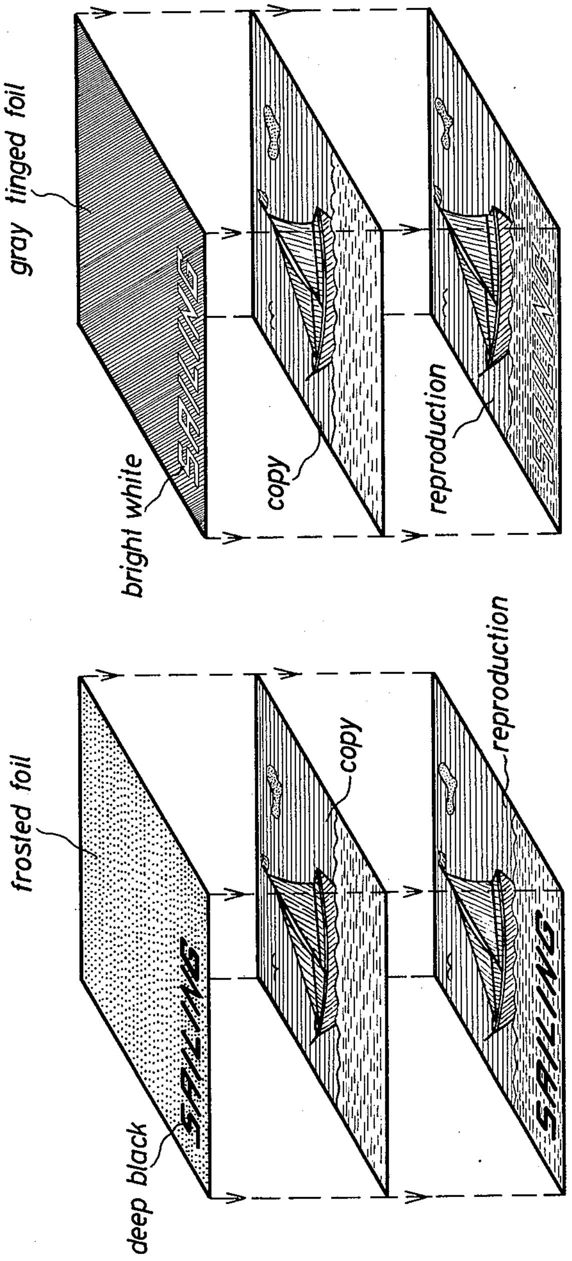

FIG. 3*a* shows the tone relationships between foil, copy and reproduction for adding dark material to a reproduction; and FIG. 3*b* shows the tone relationships between foil, copy and reproduction for adding light material to a reproduction.

Figure 1:
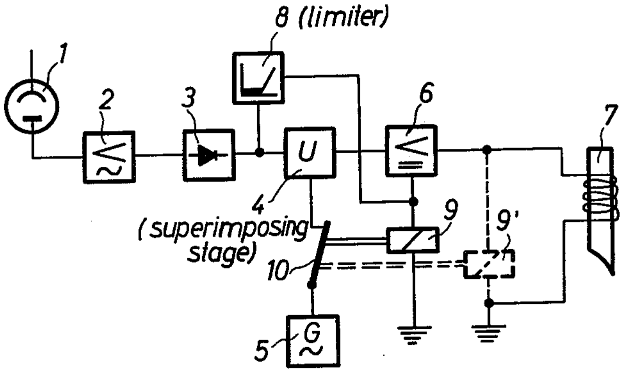
FIG. 1 shows a circuit comprising an electromagnetic control relay.

In FIG. 1, numeral 1 indicates the photocell of the scanning device, such photocell ascertaining the intensity of the light reflected from or passed through the scanned points of the picture copy to be reproduced (not shown). Numeral 2 indicates an alternating current amplifier for amplifying the currents excited by the illumination in the photocell 1, such currents fluctuating in accordance with brightness variations; it being assumed that the direct current picture signals coming from the photocell are modulated on a carrier frequency, or that the scanning light beam is periodically chopped mechanically by a rotating perforated plate so as to obtain a carrier frequency which facilitates control so far as amplification is concerned. The means for producing the corresponding carrier frequency are well known and therefore have been omitted to simplify the drawing. Numeral 3 indicates a rectifier for rectifying (demodulating) the picture signals. Numeral 4 indicates a superimposing stage in which a screen frequency supplied from a screen frequency generator 5 is (additively) superimposed on the rectified picture signals. Numeral 6 is an alternating current regulation rectifier serving for feeding current to the electromagnetic engraving system 7. Between 3 and 4, the picture signals are branched off and conducted to the low or minimum value limiter (amplitude filter) 8, which suppresses signals up to a voltage corresponding to the brightest white seen through the foil placed on the picture copy. (The manner in which the foil is prepared and in which the scanning light beam is trained upon the foil-picture copy to produce the reflected light signals affecting the photocell is well known and has been briefly described before.) The output of the limiter 8 is connected with the regulation input of the regulation amplifier 6. Upon scanning of the threshold value of the white of the foil, such as that illustrated in FIG. 3*b*, the amplifier 6 is so highly regulated by the picture signal voltage passed by the limiter 8, that the current given off thereby for the control of the engraving system 7 leaps to a higher value so as to cause the engraving tool to penetrate for the undercutting deeper into the material of the blank which is to form the printing plate.

Current from the limiter 8 is also supplied to the electromagnetic relay 9 which controls a normally closed contact 10. This relay will be energized upon appearance of the picture signal voltage which corresponds to the threshold value of the white on the foil and will accordingly open its contact 10 to interrupt the connection between the screen frequency generator 5 and the superimposing device 4. The further engraving will accordingly be effected without point screening, that is, the half-tone engraving will pass or change into line engraving. So long as the screen generator 5 is disconnected, that is, for the duration of the white parts on the foil, the engraving tool will not leave the plate blank, will not execute any up and down motion with respect thereto, but will instead cut uniformly deep grooves thereinto.

Instead of connecting the relay 9 with the limiter 8, it may also be connected in series with the engraving system or in parallel thereto, as shown in dotted lines, the corresponding relay, marked 9', receiving in such a case current from the amplifier 6.

Disconnection of the point screening is unnecessary upon scanning of the lower threshold of the black of the foil, such as illustrated in FIG. 3*a*, because, in such a case, the reciprocating engraving tool will not reach the plate blank at all. It may be mentioned in this connection that the known setting of the black level and the white level is effected so that the engraving tool will upon appearance of the blackest picture points just touch the surface of the plate blank, cutting out very small white points, while penetrating upon appearance of the brightest picture points into the plate blank, cutting out material therefrom but leaving very small black dots or points.

Figure 2:
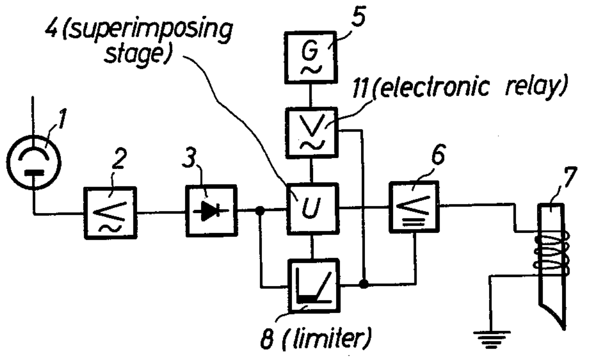
FIG. 2 shows a variant of the circuit comprising an electronic control relay.

In the circuit according to FIG. 2, an electronic relay 11 is employed in place of the electromagnetic relay 9 (9') shown in FIG. 1. The frequency supplied by the screen generator 5 is conducted by way of the electronic relay 11 (operating as a regulation amplifier) which is regulated by the limited picture signal voltage coming from the limiter 8 so as to transmit the screen frequency so long as the picture signals do not exceed the voltage corresponding to the brightest white of the picture copy, and to block transmission of the screen frequency when the picture signals reach or exceed the voltage corresponding to the threshold value of the white parts of the foil.

The electronic relay or amplifier 11, in the simplest case, may be an electronic switching tube, for example, a thyratron operating as a current gate, with the grid so slightly negatively biased as to remain conductive so long as the picture signal voltage is lower or equal to the voltage which corresponds to the brightest white of the picture copy, the grid being made so strongly negative by the picture signal voltage corresponding to the white of the foil, as to cause the tube to cut off, thereby disconnecting the screen frequency from the generator 5. It is understood, of course, that the grid potential must be suitably chosen with respect to the potential at the output of the limiter 8.

The line screen, that is, the number of lines per centimeter is provided so high, approximately 100 lines per centimeter, that it suffices for line engraving.

Changes may be made within the scope and spirit of the appended claims which define what is believed to be new and desired to have protected by Letters Patent.

I claim:

1. In the art of producing in an electronically controlled machine screened half-tone printing plates by photoelectric scanning of corresponding half-tone picture copies and simultaneous engraving, by means of an engraving tool, of a blank which is to form the printing plate for the reproduction of a desired half-tone picture copy, a method of including in the corresponding half-tone printing plate by line engraving untoned matter of the class consisting of writing, lettering, line drawing and the like, which is normally extraneous to the picture copy to be reproduced, comprising the following steps, namely, disposing the extraneous matter in deep black and/or bright white representation thereof upon the half-tone picture copy to be reproduced for the photoelectric scanning thereof, lightening the dark parts of said picture copy and darkening the bright parts thereof, the extraneous black matter appearing blacker than the darkest lightened parts on said picture copy and the extraneous white appearing brighter than the darkened brightest parts on said picture copy, photoelectrically scanning said half-tone picture copy and the extraneous matter disposed thereon, changing the half-tone engraving to a line engraving upon ascertaining by said scanning the upper threshold value of the extraneous white matter, and resuming half-tone engraving again upon ascertaining by said scanning a value lying below said threshold value.

2. A method according to claim 1, wherein undercutting engraving is effected for the duration of said upper threshold value ascertained by said scanning.

3. In an electronically controlled machine for producing screened half-tone printing plates having untoned matter thereon of the class consisting of writing, lettering, line drawing and the like, which is normally extraneous to the picture copy to be reproduced, the combination of means for photoelectrically scanning a half-tone picture copy to be reproduced to produce signals denoting the relative brightness of parts scanned on said picture copy, means for producing a screen frequency, means for mixing said screen frequency with the picture signals, to which said screen producing means and said scanning means are operatively connected to produce composite signals affected by said screen frequency, a regulation amplifier operatively connected to the output of said mixing means for amplifying the composite signals to produce control currents for actuation of an engraving tool adapted to engrave the contents of the photoelectrically scanned half-tone picture copy in the form of a screened pattern on a blank which is to form the printing plate, a relatively thin and translucent slightly frosted and slightly gray tinged foil on which is disposed the extraneous untoned matter which is to be added to the half-tone picture copy to be reproduced, said foil being positioned upon the corresponding picture copy for photoelectrical scanning therewith, the frosting of said foil lightening the dark parts of said picture copy and the gray tinge of said foil darkening the bright parts thereof, the black matter on said foil appearing blacker than the darkest parts of said picture copy visible therethrough and the white matter on said foil appearing brighter than the brightest parts on said picture copy visible therethrough, means operatively disposed between said screen frequency producing means and said mixing means for operatively disconnecting the screen frequency producing means therefrom, and control means operatively connected to said photoelectric scanning means and said disconnect means for controlling the latter to operatively disconnect said screen frequency producing means from said mixing means upon ascertaining the upper threshold value of the white matter on said foil to change said half-tone engraving on said blank to a line engraving and to cause resumption of said half-tone engraving upon ascertaining by said scanning a value lying below said threshold value.

4. A structure and cooperation of parts according to claim 3, comprising an electromagnetic relay constituting said disconnect means.

5. A structure and cooperation of parts according to claim 3, comprising an electronic device constituting said disconnect means.

6. A structure and cooperation of parts according to claim 3, wherein said control means comprises a minimum brightness limiter, a branch circuit extending from the channel for transmitting said signals produced by said photoelectric scanning and including said limiter which suppresses the voltage values of said signals up to a value corresponding to the brightest white ascertained on said picture copy, circuit means for connecting the output of said limiter with the input of said regulation amplifier for transmitting thereto the limited signal voltages so as to cause said regulation amplifier to produce upon appearance of a voltage corresponding to the threshold value of the white on said foil a leap in the control current delivered thereby to a value causing said engraving tool to penetrate deeper into said blank to effect undercutting engraving for the duration of said control current.

7. A structure and cooperation of parts according to claim 6, wherein said disconnect means is operatively controlled by said limiter.

8. A structure and cooperation of parts according to claim 6, wherein said disconnect means is operatively controlled by said regulation amplifier.

References Cited in the file of this patent

UNITED STATES PATENTS

| | | |
|---|---|---|
| 2,020,820 | Briel | Nov. 12, 1935 |
| 2,824,905 | Farber | Feb. 25, 1958 |

FOREIGN PATENTS

| | | |
|---|---|---|
| 110,148 | Australia | Apr. 4, 1940 |